June 24, 1930.  E. R. WHITNEY  1,768,225
DOUBLE CONCENTRIC GEARING
Filed Oct. 17, 1928  2 Sheets-Sheet 1
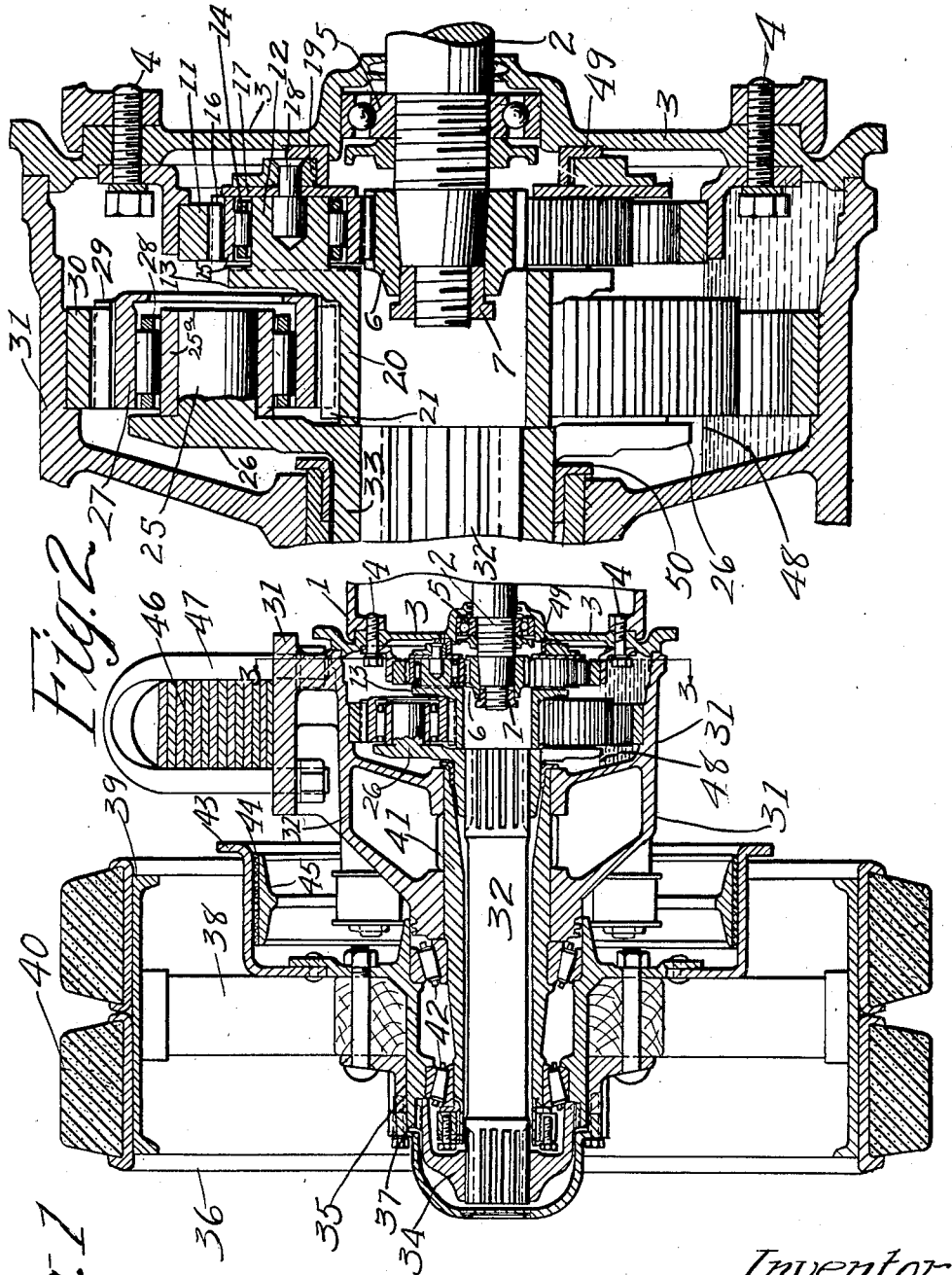
Inventor:-
Eddy R. Whitney
by his Attorneys
Howson & Howson June 24, 1930.    E. R. WHITNEY    1,768,225
DOUBLE CONCENTRIC GEARING
Filed Oct. 17, 1928    2 Sheets-Sheet 2

Inventor:—
Eddy R. Whitney
by his Attorneys
Howson & Howson

Patented June 24, 1930

1,768,225

UNITED STATES PATENT OFFICE

EDDY R. WHITNEY, OF PHILADELPHIA, PENNSYLVANIA

DOUBLE CONCENTRIC GEARING

Application filed October 17, 1928. Serial No. 313,059.

This invention relates to a planetary gear train comprised of a plurality of concentric gear systems.

An object of the invention is to devise a planetary gear train having a plurality of concentric gear systems.

Another object is to produce a planetary gear train having a plurality of gear systems, the high speed system being of smaller diameter than the lower speed system.

Another object is to produce a planetary gear train comprised of a plurality of gear systems, the high speed system running out of the oil bath and the lower speed system running in the oil bath.

Another object is to produce a planetary gear train having floating intermediate gears.

Another object is to produce a planetary gear train having floating intermediate members, limiting bearings being provided for the floating gears.

Still another object is to produce a planetary gear train having a plurality of gear systems, the hub of the spider holding the intermediate gears of the first system acting as the pinion for the second system.

Yet another object is to provide a new and improved form of planetary gearing.

Other objects will appear hereinafter.

In the drawings, which illustrate one form of my invention,

Fig. 1 is a transverse section taken substantially along the line 1—1 of Fig. 3, illustrating the features of my invention as applied to the driving mechanism of a truck or the like;

Fig. 2 is a fragmentary sectional view illustrating the details of the planetary gear train on an enlarged scale, while

Figure 3:
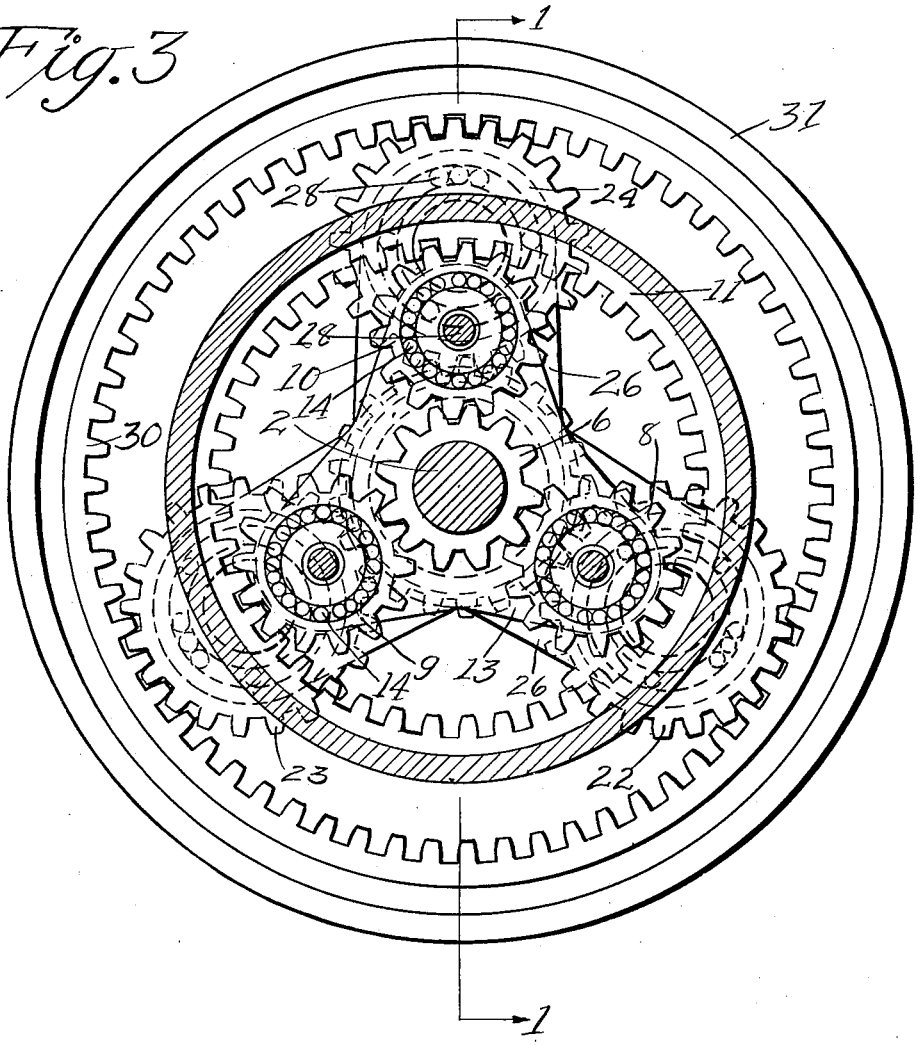
Fig. 3 is a view taken substantially along the line 3—3 of Fig. 1.

As shown, a motor 1, supported by any suitable means (not shown), is provided with a driving shaft 2. The motor is preferably covered by a plate 3 which acts both as a motor head and as a gear-case cover. This plate 3 is secured to the frame of the motor 1 by any suitable means, such as bolts 4. It is to be understood however, that the plate 3 may be integral with the motor frame without departing from the spirit of my invention.

The shaft 2, before referred to, is preferably mounted in any suitable bearing 5 and carries adjacent its end a pinion 6 which may be of any desired form. This pinion is fixed on the shaft 2 by conventional locking means 7. The pinion 6 forms the drive means for a reduction gear system having a plurality of intermediate gears 8, 9 and 10 which mesh with a fixed annulus 11. The annulus 11 is preferably carried by the plate 3, and in the present instance, is secured thereto by means of the bolts 4.

While the intermediate gears may be of any conventional type, in the present instance each is mounted on a central trunnion 12, forming an integral part of a spider 13. Rotating about the trunnion 12 and spaced therefrom by the intermediary of roller or other type of bearings 14, is a ring gear 15 having a plurality of gear teeth 16, the teeth 16 meshing with those of the annulus 11. The gear 15 may be restrained from lateral movement with respect to the trunnion, on one side by means of the adjacent face of the spider 13, and on the other side by means of a face plate secured against the trunnion by any suitable means such as a rivet 18. This rivet also carries an abutment member 19, for a purpose which will be developed later. The pinion 6, intermediate gears 8, 9 and 10, and annulus 11 form the high speed system, before referred to.

The spider 13 has a rearwardly projecting portion 20 having gear teeth 21, integrally formed thereon or attached thereto by any suitable means. The portion 20 thus forms a driving pinion for a second system of reduction gearing. The pinion 20 drives a plurality of intermediate or idler gears 22, 23, and 24.

These gears, as were the gears 8, 9, and 10, may be of any conventional type. In the present instance, they are each provided with a central trunnion 25 extending from a spider 26, and carrying thereon a bushing 25ª. A ring-like member 27 extends about the bushing 25ª, and is spaced therefrom by the intermediary of roller—or other type of bearings 28. The member 27 is restrained from lateral movement with respect to the trunnion by means of the adjacent faces of the spiders 13 and 26. The member 27 is provided on its exterior face with a plurality of gear teeth 29 which mesh with cooperating teeth of the annulus 30. The last mentioned gear is fixed to the gear housing 31 in any desirable manner.

Power is transmitted from the spider 26 by a rearwardly extending portion 33 thereof to a shaft 32 which is splined or fixed thereto by other desirable means. At its opposite end, the shaft 32 is likewise splined or secured by other suitable means to a rotating element 34, which in turn, is operably associated with a hub 35 of the wheel 36, by means of a driving dog 37 or by other conventional means. The hub 35 in the present instance, carries spokes 38 to which is attached at their outer ends a felloe 39. As shown, the felloe is provided with one or more tires 40. It is understood of course, that the wheel may be of any conventional type. In the modification shown, the hub 35 is rotatably mounted about the axle spindle 41 in which the shaft 32 rotates, by means of suitable bearings 42.

The hub may have mounted thereon a drum 43 for the reception of internal brake-shoes 45, each fitted with a brake-lining 44. This drum may be of any conventional type, or may be omitted entirely, without departing from the spirit of the invention.

A spring 46 is shown as carried on the gear housing 31, or is affixed to other portions of the axle, by means of a strap or clip 47.

As before pointed out, the high speed system of gearing comprising the pinion 6, intermediate gears 8, 9, and 10, and annulus 11 is of smaller diameter than the low speed system comprised of pinion 20, intermediate gears 22, 23, and 24, and annulus 30. The lower part of the housing 31 is filled with oil, or other suitable lubricant to a desired level 48. This level, as is evident from the drawings, is of such a height that while the low speed system runs in the oil bath, the smaller diameter, high speed system does not extend therein.

It has been determined that considerable energy losses result from meshing under an oil bath, and that this loss is proportional to the speed of the meshing gears. Thus by having the high speed system of such diameter that the system does not run in the oil bath, the energy lost due to meshing under oil is confined solely to the large diameter, slow speed system. The high speed system is provided with sufficient lubricant as a result of the splash and drip from the slow speed system.

As a result of this construction, the pinion 6 and the annular gears 11 and 30 are fixed or constrained as to centers, while the intermediate gears and the pinion 20 are not definitely constrained about the central axis of rotation, but are to a certain extent, "floating". By cutting all the gears with a predetermined, rather large amount of clearance, the floating gears are permitted to find their own centers under load, and to rotate about such centers. Thus, all of the gears take their proper share of the load.

In order to limit the amount of eccentricity of the floating gears, when under light loads and when the tooth pressures are not sufficiently high to center the loose gears, the casing is provided with limiting bearings, one of which takes the form of a ring 49, while another is shown as a bushing 50. Until the floating gears are loaded sufficiently to center them, their maximum eccentricity is determined by the limiting bearings. By so designing the mechanism that the amount of radial clearance between the limiting bearing members is more than the amount of eccentricity which the floating gears will run at under load, it is possible to prevent contact between the bearing members when the gears are rotating at or above a certain predetermined load. The purpose of providing limiting gears is to keep the gears from "bottoming" into each other, or dropping too far out of cent when worn, when coasting under light load, and to eliminate noise under these circumstances, and withal to maintain an equal division of the load between the intermediate gears.

Another feature of novelty resident in the invention, is that the first or high speed reduction system can be readily dismantled, permitting access to the second or low speed reduction system. This is brought about by the construction of the plate 3, which is affixed to the motor casing 1, and which has attached thereto the annulus 11. Since the shaft 2 carrying the pinion 6 is also carried by the motor casing, the plate 3, annulus 11, shaft 2, and pinion 6 may be removed as a unit, permitting easy demounting of all the gearing. Without this method of assembly, it would be extremely difficult to gain access to the second reduction system, unless, fortuitously, the first reduction system had an annulus of larger internal diameter than that of the second system.

It is of course, understood that the invention is susceptible to numerous modifications and adaptations, and it is intended that it be limited only by the scope of the appended claims.

I claim:

1. In combination, a concentric gear system having a central pinion, an annulus arranged thereabout, a plurality of intermediate gears carried by a spider and located between said pinion and said annulus, said spider having a rearwardly extending hub on the exterior of which is mounted a plurality of gear teeth, an annulus arranged about said hub, and a spider affixed to a drive shaft, said spider carrying a plurality of intermediate gears located between said hub and said last mentioned annulus, the intermediate gears being held by said spider in fixed axial relation to one another, the spider being adapted for both radial and circumferential movements.

2. In combination, a motor, a drive shaft carried by said motor, a pinion mounted on said shaft, a face plate on said motor, an annulus carried by said face plate, intermediate gears arranged to "float" radially between said pinion and said annulus, and a bearing member carried on said face plate to limit the eccentric movement of said intermediate gears, only when the gears are running below a critical load.

3. In combination, a motor having a shaft carrying a pinion, a cover plate for said motor, an annulus carried by said cover plate and being concentric with said pinion, a plurality of intermediate gears floating radially between said annulus and said pinion, and an annular member carried on said cover plate for limiting the eccentric movement of said intermediate gears, only when the gears are running below a critical load.

4. In a gear train, a central gear, a concentric annulus, a system of intermediate gears between said central gear and said annulus and adapted for floating, and an annular bearing concentric with said central gear and disposed adjacent said intermediate system gear so that it will limit the eccentricity thereof when at rest or below a critical load, and will be in an inoperative position when the intermediate gear system is operating at or above a critical load.

5. In combination, a plurality of complete, separate, gear systems, placed side by side and arranged substantially coaxial with each other, and a motor for actuating said systems placed on the side of one of said systems opposite from the other, the driving pinion and intermediate gears of the first mentioned of said systems being mounted on the motor, so that ready access to the second system may be had by removing the motor.

6. A gear train comprising a central gear, a concentric annulus, a system of intermediate gears, and means for supporting said system of intermediate gears, movable with respect to the said annulus, whereby the said system of intermediate gears is adapted to float in a radial direction to adapt itself to loads on the gear train, and means for limiting the amount of floating and for preventing "bottoming" of the gears.

7. A gear train comprising a central gear, a concentric annulus, a system of intermediate gears, and means for supporting said system of intermediate gears, movable with respect to the said annulus, whereby the said system of intermediate gears is adapted to float in both radial and circumferential directions to adapt itself to loads on the gear train, and means for limiting the amount of floating and for preventing "bottoming" of the gears.

8. A gear train comprising adjacent planetary systems each including the usual sun and orbit gears and planet assembly associated with said sun and orbit gears, the orbit gears of said systems and the sun gear of one of the systems being relatively radially fixed, the planet gears of the assembly of each system being radially fixed with relation to one another and radially displaceable with relation to their respective sun and orbit gears, and means limiting such radial displacement and preventing "bottoming" of the gears.

9. A gear train comprising adjacent planetary systems each including the usual sun and orbit gears and planet assembly associated with said sun and orbit gears, the orbit gears of said systems and the sun gear of one of the systems being relatively radially fixed, the planet gears of the assembly of each system being radially fixed with relation to one another and radially displaceable with relation to their respective sun and orbit gears, and means limiting such radial displacement and preventing "bottoming" of the gears, the sun gear of one of said systems being supported by and from a planet gear assembly of the other of the systems.

EDDY R. WHITNEY.